United States Patent [19]

Mason

[11] 4,191,472

[45] Mar. 4, 1980

[54] APPARATUS FOR THE ELEVATION OF COINS

[76] Inventor: Derek Mason, 351 Linda Way, Mill Valley, Calif. 94942

[21] Appl. No.: 842,777

[22] Filed: Oct. 17, 1977

[51] Int. Cl.[2] ........................ G02B 27/00; G09B 25/00

[52] U.S. Cl. ........................................ 356/243; 35/50; 356/394

[58] Field of Search .................. 350/30; 356/168, 243, 356/256; 35/50, 28.3

[56] References Cited

U.S. PATENT DOCUMENTS

| | | | |
|---|---|---|---|
| 824,374 | 6/1906 | Munsell | 35/28.3 |
| 2,571,188 | 10/1951 | Benson | 356/168 |
| 3,609,045 | 9/1971 | Stein | 356/243 |

FOREIGN PATENT DOCUMENTS

| | | | |
|---|---|---|---|
| 351350 | 6/1931 | United Kingdom | 35/50 |

OTHER PUBLICATIONS

Kelly et al., "The ISSC-NBS Method of Designating Colors & Dictionary of Color Names," National Bureau of Standards Circular 533, 11-1-55, Taken from Color, Universal Language & Dictionary of Names, N.B.S. Special Publication #440, 12-1976, pp. 5-8.

*Primary Examiner*—John K. Corbin
*Assistant Examiner*—Wm. H. Punter
*Attorney, Agent, or Firm*—Townsend and Townsend

[57] ABSTRACT

A method and apparatus for evaluating coins on an objective basis. A support structure displays facsimile coins representative of the obverse and reverse sides of a given class of coins. The facsimile coins within the obverse and reverse groups are further divided into sets. Each set contains facsimile coins representative of a particular type of coin defect or imperfection. The facsimile coins within a set are arranged according to increasing or decreasing extents to which the coin defect is exhibited. Each of the facsimile coins has assigned to it a number representative of the relative value of the facsimile coin in regard to that particular coin defect. The obverse and reverse sides of a test coin are compared with the facsimile coins within each set. The numeric values of the facsimile coins which exhibit the coin defects to the same extent as the test coin are noted and summed to arrive at a total numeric value for the coin. The monetary value of the test coin is then determined by a table which correlates the total numeric value of the test coin with its monetary value.

28 Claims, 3 Drawing Figures

| TOTAL NUMERIC VALUE | MONETARY VALUE |
|---|---|
| 50 | $250 |
| 49 | $220 |
| . . . | . . . |
| 36 | $42 |
| 35 | $38 |
| . . . | . . . |
| 8 | $3 |

APPARATUS FOR THE ELEVATION OF COINS

BACKGROUND OF THE INVENTION

1. Field of the Invention

The present invention relates to an apparatus and method for determining the numismatic quality and thus the monetary value of coins. The monetary value of a coin of a particular mint mark, date and class is determined by its quality, that is by the extent to which the coin does or does not exhibit defects or imperfections. The present invention provides an apparatus and a method for using the apparatus which enables the numismatist to accurately and objectively determine the monetary value of coins.

2. Description of the Prior Art

The prior art approaches to evaluating coins involve the classification of a coin within one of at least eight qualitative categories. These categories are generally identified as "good", "very good", "fine", "very fine", "extremely fine", "about uncirculated", "uncirculated", and "proof." The difficulty inherent in classifying a coin within one of these categories, and thus determining the numismatic quality of a coin, is in defining what is meant by each of the terms designating a particular category.

Prior methods for classifying coins within these categories involve the use of textual descriptions, lined drawings, and photographs. Textual descriptions of coins representative of a particular category are of only limited help when evaluating a coin because of different meanings placed on the words by various numismatists. The result of relying on textual descriptions of the categories is that a coin's numismatic quality is determined subjectively. Thus, to a large extent the category to which a coin is assigned depends upon the numismatist conducting the evaluation. Similarly, the use of lined drawings of coins meant to be representative of a particular category results in a subjective evaluation because of lined drawings do not accurately represent the characteristics of actual coins. Further, lined drawings are meant to represent only one particular type of defect or imperfection, namely, "wear." They do not represent other types of defects used in evaluating a coin; such as "strike," "bag marks" and "luster."

The same problems in coin evalution which result from reliance upon textual descriptions or lined drawings are present in those methods which rely on photographs of actual coins. The photographs often are of coins which are representative of a combination of the types of defects used in evaluating coins. That is, photograph may be of a coin having excellent luster but numerous bag marks. For evaluating coins with the help of such photographs it is often difficult to adequately and objectively take into consideration each one of the defects.

Thus, the prior art methods of evaluating coins are subjective methods which confusingly combine rather than isolate the types of defects which control the evaluation of coins. In fact, the prior art methods for evaluating coins give the appraiser little if any objective help. The main ingredients in an accurate prior art appraisal of a coin are the appraiser's skill and experience. This leaves an individual a wide latitude in establishing a coin's "true" value. Aside from genuine differences in the proper evaluation of a coin, the prior art appraisal methods also leave much operating room for unscrupulous persons. Thus, the overvaluation of coins by sellers is frequent. If a coin which in reality has a quality of "extremely fine" is valued as "uncirculated," its monetary value might be increased by a factor as high as 100 or more.

Another problem inherent in the prior art methods of evaluating coins results from the fact that the predominant monetary value of a coin is concentrated in only one or two particular categories. Thus, categories of "extremely fine" or below constitute perhaps only five percent of the potential monetary value of the coin. On the other hand, as much as ninety-five percent of the potential monetary value of the coin may rest in the "uncirculated" and "proof" categories. In short, the monetary value of a genuine coin does not increase linearly as a coin advances in the categories presently used to evaluate coins.

Applicant's invention solves many of the problems encountered in the prior art methods of evaluating coins since it enables the objective, standardized evaluation of coins by isolating the various types of defects which determine the value of coins. Thus, a numismatist is not confused by a photograph or a textual description of a coin having, for example, numerous bag marks yet high luster.

SUMMARY OF THE INVENTION

The present invention provides a method and apparatus for evaluating coins on an objective basis. Generally speaking, this is done by comparing the obverse and reverse sides of a given coin (hereinafter "test coin") having a given mint mark and date with a number of facsimile coins which are representative of a variety of coin imperfections or defects and which represent such defects to varying degrees. The facsimile coins which closest resemble the defects of the test coin are noted and through the use of a numerical gradation system the monetary value of the test coin can be established.

The facsimile coins are divided into a number of coin defect types. It is presently contemplated to divide the facsimiles into four sets, representative of four types of defects, namely "wear," "strike," "marks," and "luster." A predetermined number of facsimile coins is provided for each defect type, exhibiting the defect to varying degrees. All facsimile coins of a given defect type form a facsimile coin "set." Thus, within each set each facsimile coin exhibits the defect to a greater or lesser extent, normally from a perfect coin, in which the particular defect is absent, to a facsimile coin on which the particular defect is present to such an extent that it establishes the lowest possible coin value in regard to that defect.

The facsimile coins are mounted to a support structure such as a flat sheet, which arranges the coins of each set side by side, preferably in an increasing or decreasing order of their defectiveness. Each facsimile coin within the set is further assigned a numerical evaluation number which is representative of the extent to which the corresponding facsimile coin exhibits the defect and of the extent to which the defect affects the relative value of the coin.

A test coin is evaluated in accordance with the present invention by sequentially comparing both its obverse and reverse sides with corresponding obverse and reverse facsimile coins of each set. The numbers assigned to the facsimile coins in each set which closest resemble the particular defect of the test coin are summed to obtain a numeric total for the test coin which bears a direct relationship to the relative value of the coin. The monetary value of the coin is then readily established from periodically published tables which correlate the numeric totals with monetary values of the coins, the monetary values being determined by the extent to which the coin has defects or imperfections.

It should now be apparent that the present invention enables the evaluation of coins which leaves little, if any room for subjective interpretation and, therefore, subjective evaluation of the coin with all its above discussed shortcomings. With a sufficient number of facsimile coins in each set, the facsimile coin in each set which has the particular coin defect to an extent closest to that of the test coin is readily and objectively selected. Once that is accomplished, the determination of the monetary value of the test coin is a simple, mechanical task, requiring no more than the summation of the numbers assigned to the selected facsimiles and locating the monetary value on periodically published tables which correlate monetary values with the possible numeric totals.

A significant feature of the present invention assuring the objective evaluation of test coins is the fact that the various defects are isolated one from the other. Thus, when determining the luster of a coin, for example, the test coin is compared with facsimile coins which are perfect in every respect except for variations in the luster. The actual comparison process is thus not influenced by other coin defects which may distract the numismatist. He is free to concentrate his comparison on one and one defect type only. After the presence of a luster defect is quantitatively determined, he goes on to the next defect type, say bag marks. This process is continued until all defect types determining the relative value of a test coin have been quantitatively analyzed.

The end result is that the present invention provides an excellent, objective method of appraising a coin both qualitatively and quantitatively. This assures an evaluation of the test coin which is quite close to the actual value and which, equally important, leaves little leeway for subjective interpretations and intentional or unintentional, subjective mis-evaluations.

The presently contemplated four coin defect types are described in more detail below. It should be apparent that additional or different defect types may be employed if that appears desirable for a particular coin.

The defect type "wear" is the main measure of a coin's numismatic value. Wear is a measure of the effacing or eroding of the sides or faces of a coin as a result of ordinary use or circulation.

"Strike" is a measure of the quality of the impression on the coin made by the die. Improper striking pressure and worn dies cause variations in the strike of a coin. Uncirculated coins of the same date and mint mark can, therefore, have different numismatic values because of different strike qualities.

"Marks," also referred to as "bag marks," are abrasions on a coin caused by its contact with other coins. This defect type is most frequently used in evaluating silver dollars, which unlike most other coins, were placed into bags after minting. Thus, even though a silver dollar may be uncirculated, it may exhibit bag marks, which reduce its numismatic value.

"Luster" is a measure of the brightness or brilliance of a coin. Luster is most important as a factor for evaluating silver coins, since silver is the most reflective of all metals used in the making of coins. The luster of silver coins is affected by the annealing process of the silver planchets and by storage conditions.

A further advantage of the present invention which reduces the cost of appraising coins is derived from the fact that most of the facsimile coins can be made of materials other than the material of which the actual coin is made. For example, all facsimile coins other than those exhibiting luster defects may be made from low cost metals such as nickel. Only the facsimile coins exhibiting luster defects need to be made of the actual coin metal, say silver. Furthermore, the thickness of the facsimile coins need not be the same as that of the actual coins. For these reasons the cost of the facsimile coins can be held to a minimum, making the present invention economically more attractive.

DESCRIPTION OF THE PREFERRED EMBODIMENT

Figure 1:
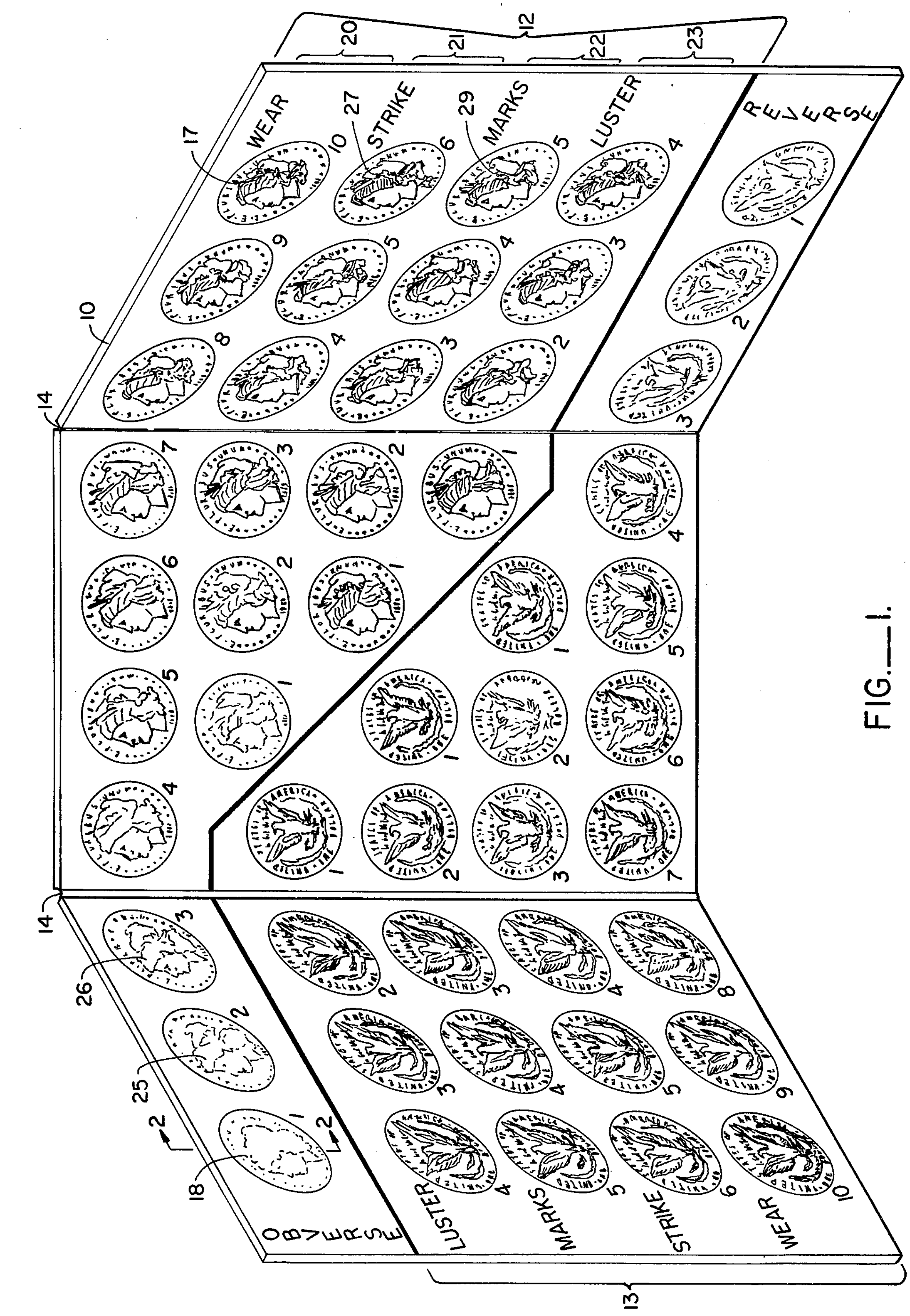
FIG. 1 is a perspective view of the apparatus.
Figures 2, 3:
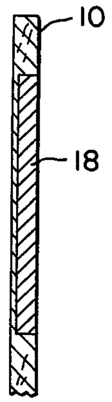
FIG. 2 is a sectional view illustrating the retention of one of the facsimile coins in the support sheet.
FIG. 3 is a view of a sample table for correlating the total numeric value of a test coin with its monetary value.

The apparatus for evaluating coins is illustrated in FIG. 1. A number of facsimile coins are displayed on a suitable support structure such as a flat cardboard sheet 10. The facsimile coins may be retained on the support sheet by forcibly fitting them into cut-outs in the cardboard as shown in FIG. 2. The sheet is provided with hinged means such as score lines 14 for folding the sheet into a closed position for storing and protecting the facsimile coins.

The facsimile coins mounted to sheet 10 are all of the same class. That is, they all depict coins of the same design and denomination. Examples of such classes of coins are Jefferson nickels, Washington quarter dollars, Franklin half dollars, and Morgan silver dollars.

The facsimiles affixed to sheet 10 are divided into two groups, a first group 12 defined by facsimile coins depicting the obverse side of a particular coin and a second group 13 defined by facsimile coins depicting the reverse side of the same coin.

Each group is further divided into a plurality of sets of facsimile coins. Thus in the obverse group 12, there are four sets, each set of facsimile coins being arranged in rows. Each set contains facsimile coins that depict a particular type of coin defect or imperfection. In a presently preferred embodiment, four types of coin defects are depicted by facsimile coins arranged in four sets. A "wear" set 20 in the obverse group 12 contains facsimile coins which exhibit the effacing or eroding of the sides or faces of a coin as a result of ordinary use or circulation. A "strike" set 21 of the obverse group 12 contains facsimile coins which exhibit the quality of the impression by the die in the minting process. A "bag marks" set 22 of the obverse group 12 contains facsimile coins which exhibit abrasions caused by contact with other coins during storage and transfer of the coins in bags. A "luster" set 23 of the obverse group 12 contains facsimile coins which exhibit the brilliance or brightness of coins. Similarly, the facsimile coins within the reverse group 13 are divided into a like number of sets representing the same types of coin defects as are represented by the sets in the obverse group 12.

The facsimile coins within each set exhibit the coin defect of that set to varying extents, and they are arranged in an increasing or decreasing order of their defectiveness. Each facsimile coin within the set is assigned a number representative of the extent to which that facsimile coin exhibits that coin defect. Thus, as shown in FIG. 1, there are ten facsimile coins within the wear set 20, each exhibiting the wear defect to varying degrees or extents. For example, facsimile coin 17 within the wear set 20 is a perfect coin in which the wear defect is absent. It is accordingly assigned the highest number, say "10" within the wear set 20. The numeric symbol "10" is imprinted or otherwise affixed to sheet 10 adjacent, e.g. immediately below, facsimile coin 17.

Similarly, facsimile coin 18 exhibits the wear defect to such an extent that it establishes the lowest possible coin value in regard to that defect. Accordingly, it is assigned the lowest numeric symbol of facsimile coins within the wear set. The remaining facsimile coins within the wear set are arranged within the set according to the increasing or decreasing extent to which they exhibit the coin defect. Thus the facsimile coin 25 within the wear set 20 exhibits the wear defect to an extent less than that exhibited by coin 18 but more than that exhibited by any of the other coins within the wear set. Similarly, facsimile coin 26 exhibits the wear defect to an extent less than coin 25 and coin 18 but to an extent greater than all of the remaining coins in the wear set.

Each of the other sets within a group, that is the strike set 21, the marks set 22, and the luster set 23, contains a facsimile coin in which the particular coin defect is absent and a facsimile coin which exhibits the particular coin defect to an extent so that it establishes the lowest possible value of a coin in regard to that defect. Each of the facsimile coins within the other sets are arranged, like the facsimile coins in the wear set 20, in increasing or decreasing extents to which they exhibit the particular coin defect.

The same characteristics and arrangement of facsimile coins within the sets of the obverse group 12 are repeated in the sets of the reverse group 13.

In a preferred embodiment, the highest valued coin within the wear set 20, is facsimile coin 17, which has assigned to it a numeric value greater than the numeric value assigned to the highest valued coins within any of the other sets since the wear defect is the main arbiter of coin value. For example, assigning the number "10" to facsimile coin 17 and the number "5" to facsimile coin 29, the highest valued coin within the marks set, indicates that the wear defect is approximately twice as important, i.e. affects the value of the coin twice as much, as the marks defect.

Preferably, the facsimile coins are made of metal and manufactured by means of die presses. The dies are made from genuine coins which serve as masters. The genuine coins in turn have been selected by recognized numismatic experts. Alternatively, the facsimile coins can be of a plastic material made in molds which in turn were created from genuine coins. Thus, each of the facsimile coins within the apparatus is made from its own die or mold.

In the preferred embodiment, the facsimile coins in the wear, strike, and marks sets can be made of relatively inexpensive metal, frequently a metal other than the metal of which the genuine coin is made. Usually, however, the facsimile coins within the luster set are made of the same metal of which the genuine coins are made.

The specific four sets which depict various types of coin defects may be altered somewhat depending upon the class of coin which the facsimiles represent. For example, luster is most important as a factor in evaluating silver coins, because silver is the most reflective of metals used in the making of coins. Thus, if the invention were for a class of coins made of material other than silver, such as copper or nickel, the luster set could be eliminated from the invention without detracting from its utility. Similarly, if the invention is to be used for evaluating coins other than silver dollars, the marks set could be eliminated since silver dollars are the only coins known to have been stored and transported in bags, and thus the only coins known to have various degrees of bag marks.

In evaluating a test coin in accordance with the present invention, the obverse side of the test coin is first compared with all of the facsimile coins within the wear set 20. When the facsimile coin within the wear set 20 is located which most closely resembles the extent of the wear defect exhibited by the test coin, the number appearing adjacent that selected facsimile coin is noted. The obverse side of the test coin is then next compared to the facsimile coins appearing in the strike set 21. When the facsimile coin within the strike set is located which mostly closely resembles the extent to which the test coin exhibits the strike defect, the number adjacent that selected coin is noted. This same comparison continues for the marks and luster set, and the resulting four numbers are then summed to arrive at a numeric value for the obverse side of the test coin.

The reverse side of the test coin is then sequentially compared with the facsimile coins of each set in the reverse group 13, in the same manner as for the obverse side of the test coin. A numeric value is then arrived at for the reverse side of the test coin. The numeric values for the obverse side and the reverse side of the test coin are then summed to arrive at a total numeric value for the test coin.

After the total numeric value for the test coin is computed, the monetary value of the test coin is then found by referring to a table, as shown in FIG. 3, which correlates the total numeric value of a test coin with its monetary value. The monetary values appearing in the table are assigned by recognized numismatic experts. A separate table is required for each coin of a specific data and mint mark within a class of coins.

In order to illustrate the evaluation of a test coin, it will be helpful to explain the invention by way of example as follows. Thus, assume a test coin exhibits the four types of coin defects to extents such that it most resembles the facsimile coins within the respective sets so that the following numbers adjacent those selected facsimile coins can be recorded as shown below.

| OBVERSE SIDE | | REVERSE SIDE |
|---|---|---|
| 8 | wear | 9 |
| 4 | strike | 4 |
| 1 | marks | 4 |
| 3 | luster | 3 |
| 16 | total | 20 |

In this example, the obverse side of the coin has a numeric value of 16 out of a possible of 25 and the reverse side of the coin has a numeric value of 20 out of a possible of 25. Thus the coin value of the obverse side of the test coin is represented by 16, and the coin value of the reverse side of the coin is represented by 20. The total coin value for the test coin is represented by the sum of the two numbers, or 36 out of a maximum possible of 50. This total numeric value 36 is then located in the table, as shown in FIG. 3, to arrive at the monetary value of the test coin, in this case $42.00.

With the assignment of a total numeric value to the test coin as shown above, a numismatist can arrurately report to others the value of his coins. This results in the standardization of coin evaluation in that a potential purchaser of an unseen coin can refer to the coin evaluation apparatus in order to accurately visualize the appearance and value of the unseen coin. Thus overvaluation of coins is prevented.

While the preferred embodiment of the present invention has been illustrated in detail, it is apparent that modifications and adaptations of that embodiment will occur to those skilled in the art. However, it is to be expressly understood that such modifications and adaptations are within the sphere and scope of the present invention as set forth in the following claims.

I claim:

1. A method for determining the relative numismatic quality of a test coin of a given mint mark and date comprising the steps of: forming a plurality of facsimile coin sets, each set comprising a plurality of facsimile coins, the facsimile coins in each set exhibiting only one given coin defect to varying quantitative extents while being substantially defect-free in all other respects; arranging the facsimile coins in each set in relatively close proximity to each other; assigning to each facsimile coin in each set a value representative to the extent to which such coin exhibits the defect represented by the corresponding set; comparing the test coin with the facsimile coins in each set; determining the facsimile coin in each set which exhibits the corresponding defect to an extent which closest resembles such defect on the test coin; and summing the values assigned to the facsimile coins determined to closest resemble the test coin to thereby establish an overall value for the test coin; whereby the established overall value represents the relative numismatic quality of the test coin as determined by the extent to which said defects are present on the test coin.

2. A method according to claim 1 wherein the step of forming the facsimile coins comprises the steps of forming a first group of facsimile coins for an obverse side of the test coin, and a second group of facsimile coins for a reverse side of the test coin.

3. A method according to claim 2 including the step of providing a support for the facsimile coins, and securing the facsimile coins to the support.

4. A method according to claim 3 wherein the step of assigning comprises the step of applying the value in the form of indicias to the support in the immediate vicinity of the corresponding facsimile coin.

5. A method according to claim 4 wherein the step of applying the indicias comprises the step of imprinting on the support a number for each facsimile coin.

6. A method according to claim 1 including the steps of providing a table assigning to each possible overall value a monetary value, and determining the monetary value of the test coin by first locating on the table the overall value established for the test coin and thereafter locating on the table the corresponding monetary value.

7. A method according to claim 1 wherein the step of forming the facsimile coin sets comprises the step of forming at least four facsimile coin sets exhibiting, respectively, wear defects, bag mark deflects, strike defects, and luster defects.

8. A method according to claim 7 wherein the step of forming the facsimile coin set exhibiting wear defects comprises the step of forming a greater number of facsimile coins for such set than for the other sets.

9. A method for establishing the numismatic value of a test coin having a given mint mark and date, the method comprising the steps of: forming a plurality of obverse facsimile coins for an obverse side of said coins and dividing the obverse facsimile coins in a first group of a plurality of facsimile coin sets, the coins in each set of the first group exhibiting only one given coin defect to varying degrees, the facsimile coins in one of the sets exhibiting the coin defect caused by wear; forming a plurality of reverse facsimile coins for a reverse side of said coins and dividing the reverse facsimile coins in a second group of a plurality of facsimile coin sets, the coins in each set of the second group exhibiting only one given coin defect to varying degrees; providing a support sheet for the facsimile coins; arranging the facsimile coins on the sheet with the facsimile coins of each group and of each set in close proximity to each other; securing the facsimile coins to the sheet; applying to the sheet in proximity to each facsimile coin a number which is representative of the extent to which a coin defect exhibited by such facsimile coin affects the numismatic value of the said coins; comparing the obverse and the reverse sides of the test coin with the corresponding coins; determining the facsimile coin in each set of each group which closest resembles the extent to which coin defects are present on the test coin; summing the numbers of each determined facsimile coin to generate a numeric total which has a direct relationship to the numismatic value of the test coin as it is affected by the coin defects present on the test coin; and establishing from the numeric total the monetary value of the test coin.

10. A method according to claim 9 including the step of forming more facsimile coins in the set exhibiting wear defects than in the other sets.

11. A method according to claim 9 wherein each set has a facsimile coin which is substantially defect free, including the step of assigning to such facsimile coin in the wear defect sets a number greater than the number assigned to the defect free facsimile coins in the other sets.

12. A method according to claim 9 wherein the step of forming the facsimile coins includes the step of forming at least some of the facsimile coins of a material other than the material of the test coin.

13. A method according to claim 12 including the step of forming the facsimile coins of at least one of the sets of the same material as the material of the test coin.

14. Apparatus for aiding in the evaluation of a test coin of a given class and having a given mint mark and date, the apparatus comprising: a support sheet; a multiplicity of facsimile coins of said class, the facsimile coins being divided into facsimile coin sets, each set comprising a plurality of facsimile coins, the facsimile coins in each set exhibiting only one particular coin defect to varying degrees; means securing the facsimile coin to the sheet; a symbol applied to the sheet in the proximity of each facsimile coin which is representative of the extent to which such facsimile coin exhibits a coin defect; whereby the test coin can be evaluated on the basis to which coin defects are present thereon by locating the facsimile coins on the sheet which closest resemble the extent to which the coin defects are present on the test coin, and summing the symbols to determine from the resulting symbol total the relative value of the test coin.

15. Apparatus according to claim 14 wherein the facsimile coins of one of the set represent the coin defect resulting from the normal use of the coin.

16. Apparatus according to claim 15 wherein the last mentioned set has a number of facsimile coins which is greater than the number of facsimile coins in any of the other sets.

17. Apparatus according to claim 14 wherein at least four coin sets are secured to the sheet.

18. Apparatus according to claim 17 wherein the four coin sets represent coin defects caused by wear, coin defects caused by blemishes in the luster of the coins, coin defects caused by storing the coins in bags, and coin defects caused by imperfections in the minting of the coins.

19. Apparatus according to claim 14 wherein each facsimile coin represents one of the obverse and one of the reverse sides of the given coin.

20. Apparatus according to claim 19 wherein there are a like number of facsimile coins representing the obverse side of the given coin and the reverse side of the given coin.

21. Apparatus according to claim 20 wherein the facsimile coins for the obverse sides and for the reverse side of the given coin are arranged in like sets having like numbers of facsimile coins.

22. Apparatus according to claim 14 wherein the facsimile coins of each set are arranged adjacent one another in the decreasing order in which the facsimile coins exhibit the coin defect.

23. Apparatus according to claim 14 wherein at least some of the facsimile coins are made of a material which differs from the material of which said coin is made.

24. Apparatus according to claim 23 wherein at least some of facsimile coins are made of the same material of which the said coin is made.

25. Apparatus according to claim 14 wherein the symbol comprises a number, wherein the facsimile coin within each set exhibiting the coin defect to the least extent is assigned the highest number in the set and the facsimile coin exhibiting the coin defect in the set to the greatest extent is assigned the lowest number in the set.

26. Apparatus according to claim 25 wherein the highest number assigned to the facsimile coin in at least one of the sets is different from the highest number assigned to the facsimile coins in the other sets.

27. Apparatus for aiding in establishing the numismatic value of a test coin having a given mint mark and date, and belonging to a class of coins, the apparatus comprising:

a substantially flat support sheet;

a first group of obverse facsimile coins depicting an obverse side of said class of coins;

a second group of reverse facsimile coins depicting a reverse side of said class of coins;

the facsimile coins in each group being divided into a plurality of facsimile coin sets, each set having a plurality of facsimile coins exhibiting a given coin defect only to varying degrees while being substantially free of all other coin defects, the facsimile coins in one of the sets exhibiting a coin defect resulting from the use of coins;

means securing the facsimile coins to the sheet with the facsimile coins of each group and of each set being in relatively close proximity to each other;

a number applied to the sheet in close proximity to each facsimile coin, the numbers being related to the extent to which the facsimile coins exhibit the coin defect present in the corresponding facsimile coin set, the highest number in the set representing coin defects resulting from the use of coins being higher than the highest numbers in the other sets; and a table correlating possible number totals, arrived by summing a number assigned to a facsimile coin in each set, with a monetary value established on the basis to which a test coin exhibits coin defects;

whereby the monetary value of the test coin can be established by comparing the test coin with the facsimile coins on the sheet, locating the facsimile coin in each set which closest resembles the extent to which the corresponding coin defect is present on the test coin, summing the corresponding numbers to a number total for the test coin, and locating the monetary value assigned on the table to said number total.

28. Apparatus according to claim 27 including hinge means for folding the sheet about at least one axis for storage of the sheet during non-use.

* * * * *

UNITED STATES PATENT AND TRADEMARK OFFICE

CERTIFICATE OF CORRECTION

PATENT NO. : 4,191,472

DATED : March 4, 1980

INVENTOR(S) : Derek Mason

It is certified that error appears in the above-identified patent and that said Letters Patent are hereby corrected as shown below:

Title of invention listed as APPARATUS FOR THE ELEVATION OF COINS should be listed as APPARATUS FOR THE EVALUATION OF COINS.

Signed and Sealed this

*Tenth* Day of *June 1980*

[SEAL]

*Attest:*

SIDNEY A. DIAMOND

*Attesting Officer*

*Commissioner of Patents and Trademarks*